United States Patent [19]

Kobayashi et al.

[11] Patent Number: 5,751,703
[45] Date of Patent: May 12, 1998

[54] ENERGY DISPERSAL METHOD FOR TDMA CARRIER

[75] Inventors: Hideo Kobayashi, Saitama; Takashi Inoue, Tokyo; Hiroyasu Ishikawa, Saitama, all of Japan

[73] Assignee: Kokusai Denshin Denwa Co., Ltd., Tokyo, Japan

[21] Appl. No.: 645,005

[22] Filed: May 9, 1996

[30] Foreign Application Priority Data

May 11, 1995 [JP] Japan ................................. 7-135664

[51] Int. Cl.$^6$ ................................................ H04B 7/212
[52] U.S. Cl. .................................... 370/321; 370/442
[58] Field of Search ............................... 370/321, 322, 370/337, 347, 348, 442, 468, 315, 316; 455/63, 422, 426, 11.1, 12.1

[56] References Cited

U.S. PATENT DOCUMENTS

| | | | |
|---|---|---|---|
| 3,679,983 | 7/1972 | Theriot | 375/832 |
| 5,454,005 | 9/1995 | O'Clock et al. | 375/800 |

Primary Examiner—Douglas W. Olms
Assistant Examiner—Ajit Patel
Attorney, Agent, or Firm—Nikaido Marlmestein Murray & Oram LLP

[57] ABSTRACT

In a radio communication system using time division multiple access system (TDMA) for access control method, modulation signal sent by a slave station is frequency-dispersed during a TDMA burst period by using a chirp signal which frequency changes continuously on time axis so that signal power density on communication link is decreased and interference signal affected by the slave station to another radio communication system is reduced. According to the present invention, modulation signal transmitted by each slave station is multiplied to a chirp signal which frequency changes continuously on time axis during a TDMA burst period so that carrier frequency which carries the modulation signal changes continuously on time axis to disperse on frequency axis to a predetermined bandwidth thereby decreasing signal power density of transmit signal from the slave station. In a master station, frequency dispersed receive signal from the slave station is multiplied to another chirp signal which has opposite characteristics to that of the slave station during TDMA burst period to obtain reproduced signal. Thus, interference signal by the slave station to another radio communication system is decreased, in a return link from the slave station to said master station.

1 Claim, 2 Drawing Sheets

ENERGY DISPERSAL METHOD FOR TDMA CARRIER

BACKGROUND OF THE INVENTION

1. Field of the Invention

The present invention relates to a frequency dispersion communication system for a modulation signal, and is used in all radio communication systems including a digital station radio communication system, a digital mobile radio communication system, a digital satellite communication system, and a digital mobile satellite communication system.

2. Prior Art

One of the current commercialized digital satellite communication systems using a small earth station is a VSAT (Very Small Aperture Terminal) system. Currently, a VSAT system is used in a private network including a circuit exchange system and a packet exchange system, but no direct access is carried out from a VSAT system to a public network. That corresponds to the use of a satellite link instead of a leased line which is used in a land communication network.

The service by a VSAT system is classified into (1) a bidirectional voice service and a middle rate data communication service, (2) a bidirectional non-voice communication service including a packet communication service, and (3) a one way image communication service. The conventional network structures of typical VSAT systems are classified into the following four services.

(1) Bidirectional Communication Service Using SCPC/FDMA

The main communication is voice, FAX, and data communication (around 64 kbit/s), and a link control procedure is a pre-assignment system, or a demand assignment system. As for a network structure, a mesh structure or a star network structure is possible. It is practically served in a private network between companies for a local/international link. It is essentially a leased network service having link exchange function for point-to-point communication.

(2) Bidirectional Service Using TDM/TDMA

The main communication is packet type data communication which is a non-voice communication, and the link control procedure is reservation TDMA, or slotted aloha. It has been used in POS data collection and stock management, credit card inquiry, satellite LAN, ticket reservation, ATM, file transfer between computers. It is essentially a private network having packet exchange function for point-to-point service. The communication is mainly data communication which is non-voice communication. Almost all the VSAT networks in USA are in this category.

(3) One-way Communication Service

The communication has the tendency of broadcast communication such as image etc., and generally, it is a one-way communication channel from a central office to a VSAT. Some practical examples are intracompany message, advertisement of products, lecture, seminar, document, and distribution/broadcast service of voice and/or image. An SNG service which sends image information from a VSAT to a central earth station through one-way communication channel is in this category.

(4) Integrated Communication Service

It is an integrated service based upon said three services (1) through (3), and integrates them. A network in this service is possible to cover low rate data communication, voice, FAX, high rate image, and data communication.

As described above, various kind of services using a VSAT are proposed, and some of them are commercially available, however, it is merely the use as a private network, but a satellite communication for the personal users has not been spreaded. One reason why a VSAT has not been used widely is that it is difficult to transport, trouble in usage, and mounting, because of a large antenna with diameter of 1.2 m in a terminal station. Further, cost for communication in a VSAT can not be reduced as compared with that of a conventional land circuit.

In conventional consideration of a VSAT service considering the above problems, it has been considered to be an auxiliary service in specific area like a far or remote place, where no conventional system is served. Therefore, available service has been restricted to limited service like a private network, and so, no large amount of users are expected, no efficient frequency utilization by demand assignment is expected, and as a result, it falls into a vicious cycle of high communication cost for communication.

On the other hand, a broadcast satellite (BS) antenna of approximate 40 cm diameter has been popular with consumers because of easy mounting, although it is only for reception. Therefore, an USAT which has a smaller antenna than a VSAT has been proposed. An object of an USAT is to provide a small size terminal in order to improve easy mounting, transportation, and usage. A terminal with an antenna in 40–50 cm of diameter in an USAT has a feature of simple set up like a conventional BS antenna, it may be used in a small building like a super-market, a bank, a restaurant etc., and it may be used by consumers in a final stage.

In spite of the small size of the terminal equipment, communication capacity does not decrease because of the latest improvement of satellite power. The manner of service in an USAT is basically the same as those in said VSAT. In other words, said three kinds of services and the integrated service in a VSAT are available in an USAT.

Further, the specific use of an USAT is as a portable terminal. The use of a portable terminal differs from that of a VSAT which has a semifixed terminal, but the service itself provided by an USAT is the same as that of a VSAT. A direct access from an USAT terminal to a public network, or from a public network to an USAT is not used, but a private network is basically used. This differs from a conventional Inmalsat system which has a portable terminal coupled with a public network. Although the Inmalsat system provides only voice service and low rate data communication because of restriction of the allocation of the frequency band, an USAT system which uses a fixed communication satellite having a wide frequency band may provide high rate data communication, and image communication etc. which a conventional mobile satellite communication system can not provide.

In realizing an USAT system, a problem is interference with an adjacent satellite system because of a small size antenna in an USAT. No design specification in Ku band is established for an antenna less than 1 m (50 wavelengths) of an aperture diameter. Therefore, when an USAT system is realized, sidelobe characteristics required for an USAT antenna based upon allowable interference signal by an adjacent satellite must be clearly defined, and an antenna which satisfies said characteristics must be used.

However, even when an antenna which solves an interference problem with an adjacent satellite is developed and is used, an interference signal to an adjacent satellite would be a big problem because of satellite tracking error due to an

3 unpredictable accident in an USAT system which is used by personal users. No solution for that problem has been proposed, but an antenna which satisfies sidelobe characteristics even considering the affect by tracking error must be used. Therefore, an USAT antenna with a diameter of 40–60 cm which is considerably smaller than that of a VSAT antenna has been impossible in practice.

SUMMARY OF THE INVENTION

An object of the present invention is to solve an interference problem to an adjacent satellite in an USAT system, and to provide a frequency dispersion communication system which makes it possible to use an antenna having a diameter of 40–60 cm in an USAT system.

In order to achieve the object, according to the present modulation signal frequency dispersed communication system, a modulation signal sent by each USAT station in a group of USAT stations multiplied by a chirp signal changes its frequency on a time axis so that a carrier frequency of the modulation signal also changes on a time axis to disperse to a predetermined bandwidth on a frequency axis. Thus signal power density of a transmit signal of the USAT station decreases. A center earth station (HUB station) multiplies the frequency dispersed receive signal from the USAT station with another chirp signal which has opposite characteristics to that of the USAT station during a TDMA burst period, to provide a reproduced signal. Thus, in a return link from the USAT station to the HUB station, the interference signal, by the USAT station, to another radio communication system is decreased.

A chirp signal changes its frequency for instance continuously on a time axis.

Because of frequency dispersion of a modulation signal from an USAT station by using a chirp signal which changes its frequency on a time axis, signal power density in a satellite circuit is decreased, and transmit power density out of bandwidth of an USAT station decreases. Thus, an interference problem to adjacent satellites, due to a pointing error of an antenna, is solved. Then, the size of an antenna used in a prior VSAT system having diameter 1.2 m is considerably decreased and a small size USAT antenna of diameter 40–60 cm is possible, thereby, it may serve many uses including personal users. Further, since a TDMA access control system, used in a conventional VSAT system, is used in the present invention as it is, the cost for construction of the present invention may be low.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
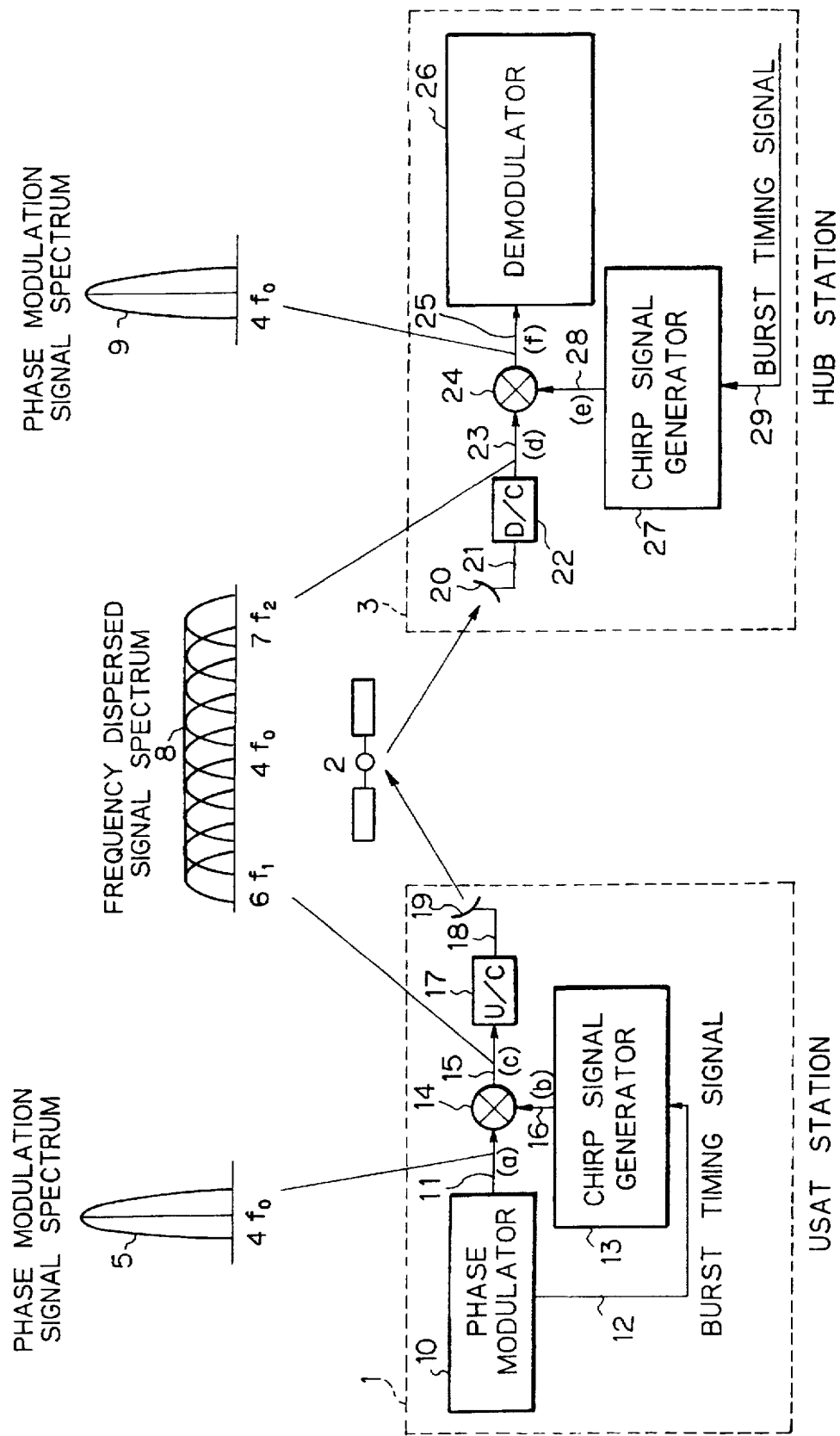
FIG. 1 shows a block diagram of a modulation signal frequency dispersed communication system using a chirp signal according to the present invention.

FIG. 1 shows an embodiment of a circuit diagram of a modulation signal frequency dispersed communication system which uses a chirp signal according to the present

4 invention. In the figure, an USAT station 1 and a HUB station 2 communicates through a satellite 2. The operation is described for a return link from the USAT station 1 to the HUB station 2. In the USAT station 1, a phase modulation signal 11, provided by a phase modulator 10, is multiplied with a chirp signal 16 provided by a chirp signal generator 13, so that the phase modulation signal is converted to a frequency dispersed signal 15.

As shown in FIG. 2, a chirp signal changes its frequency from $f_1$ to $f_2$ on a time axis with a center frequency $f_0$ of IF frequency of a communication channel during a burst period of a TDMA signal. A frequency dispersed signal 15 which is product of a chirp signal 16 and a phase modulation signal 11 is frequency-converted to a radio frequency signal 18 by an up converter 17, and is transmitted to a communication satellite 2 through an antenna 19. It is supposed that a chirp signal generator 13 and a phase modulator 10 are subject to burst timing synchronization of a TDMA signal, so that a timing of a product of a chirp signal 16 and a phase modulation signal 11, and a time length of a product for a chirp signal are finely controlled by using a burst timing information 12 which is provided by the phase modulator 10.

In a HUB station 3, a frequency dispersed signal through a communication satellite 2 is received through an antenna 20, and is frequency-converted to a IF-band frequency dispersed signal by a down converter 22, then, the IF-band frequency dispersed signal 23 is multiplied with a chirp signal 28 which is provided by a chirp signal generator 29 and has opposite characteristics to that of the chirp signal 16 in the USAT station 1 on a frequency axis. Thus, a phase modulation signal 25 with a narrow bandwidth is obtained. The phase modulation signal 25, which is inversely frequency dispersed by using the chirp signal 28, is demodulated by a demodulator 26 so that a demodulated information signal is obtained. A burst timing signal 29, which is detected by using a burst signal series for burst synchronization, controls the chirp signal generator 27, so that the TDMA burst timing synchronization of the chirp signal generator 27 and the frequency dispersed phase modulation signal 23 is finely established.

The above operation is shown by a spectrum on a frequency axis as follows. The phase modulation signal spectrum 5, which is generated by the phase modulator 10 in the USAT station 1, has a predetermined bandwidth and a predetermined power density spectrum around the center frequency $f_0$(4). When the phase modulation signal 11 is multiplied with the chirp signal 16, the phase modulation signal spectrum 5, which has a narrow band, is converted to a frequency dispersed spectrum 8 in which the frequency spectrum spreads from $f_1$(6) to $f_2$(7) around the center frequency $f_0$(4) of the IF signal of a channel. The frequency dispersed signal 8 is converted to a narrow band phase modulation signal 9 by a anti-frequency dispersed operation through multiplication with the chirp signal 28 which has opposite characteristics to that of the chirp signal 16 on the frequency axis, in the HUB station 3.

FIG. 2 shows an embodiment of the operation of a frequency dispersion process in FIG. 1 on a time axis. The symbols (a)–(c) in FIG. 2 correspond to the phase modulation signal 11, the chirp signal 16 and the frequency dispersed signal 15, respectively, in the USAT station in FIG. 1, and also correspond to the frequency dispersed received signal 23, the chirp signal 28 and the phase modulation received signal 25, respectively, in the HUB station in FIG. 1.

Figure 2D:
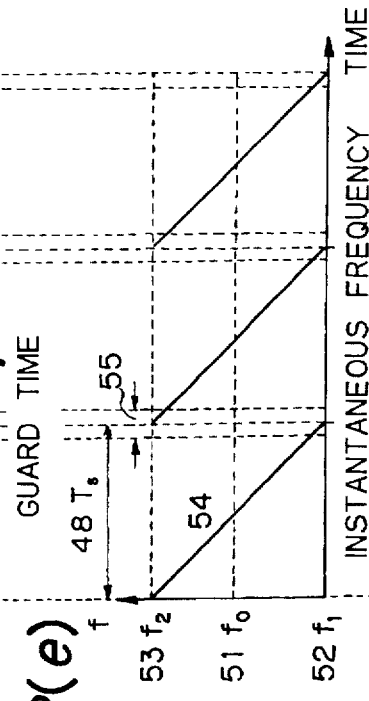
FIG. 2(a)–(f) show an embodiment of a frequency dispersion process on a time axis in the modulation signal frequency dispersed communication system using the chirp signal according to the present invention.
Figure 2E:
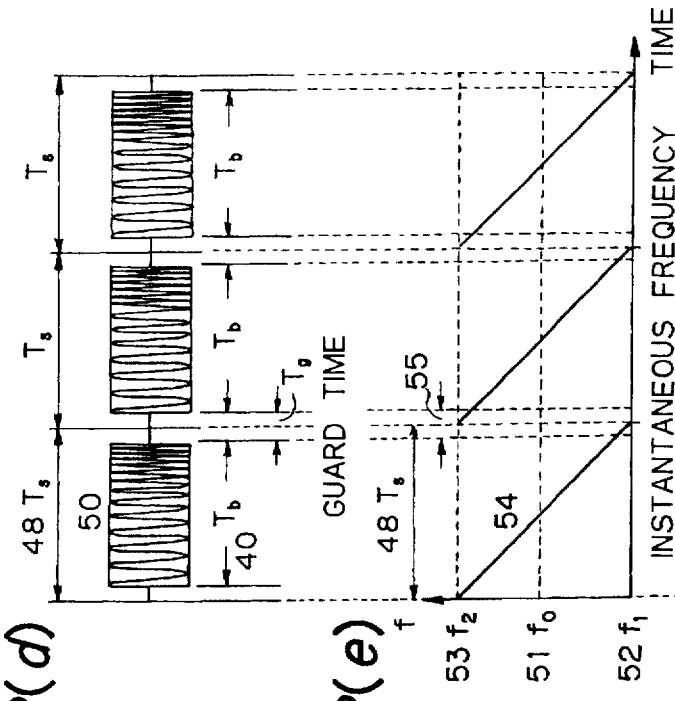
Figure 2F:
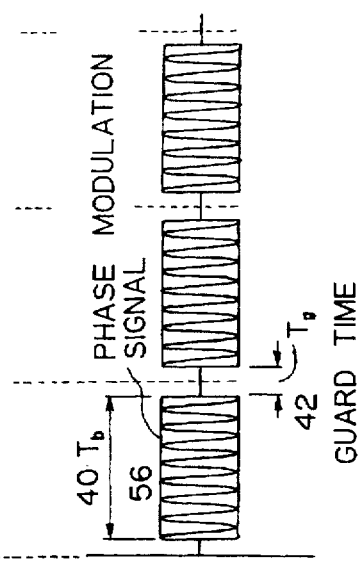
Figure 2A:
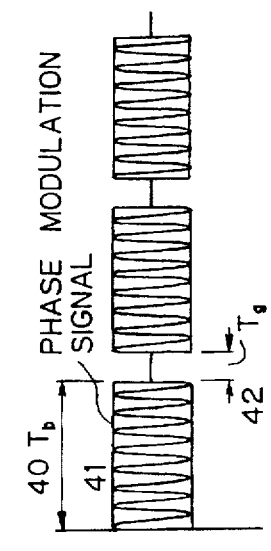

In FIG. 2(a), the phase modulation signal 41 appears during the whole burst period $T_b$, and a guard time $T_g$ (42), for a timing control error, is inserted between adjacent burst signals. The length of a burst period of a TDMA signal is defined as $T_b+T_g$. The phase modulation signal 41 is multiplied with the chirp signal 46 in FIG. 2(b), which has its frequency change continuously from $f_1$(44) to $f_2$(45) with a center frequency $f_0$(43), then, the product of the multiplication is a frequency dispersed signal 49 in FIG. 2(c). It should be noted that the multiplication of the phase modulation signal 41 with the chirp signal 46 is carried out only during the signal transmission period $T_b$(40), and the frequency $f_2$(47) of the chirp signal is reset to $f_1$(44) during the guard time (47).

In FIG. 2(d), the frequency dispersed signal 50 received in the HUB station is divided into a TDMA burst signal with the time length $T_g$(48) based upon a TDMA burst timing information (not shown). Since a guard time $T_g$(42) is set between each burst signals, the frequency dispersed signal (50) having a time length $T_b$(40) is always within the burst length $T_s$(48) of a TDMA signal.

Figure 2B:
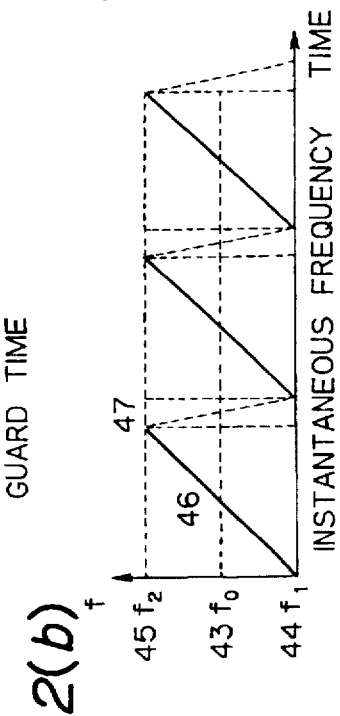
Figure 2C:
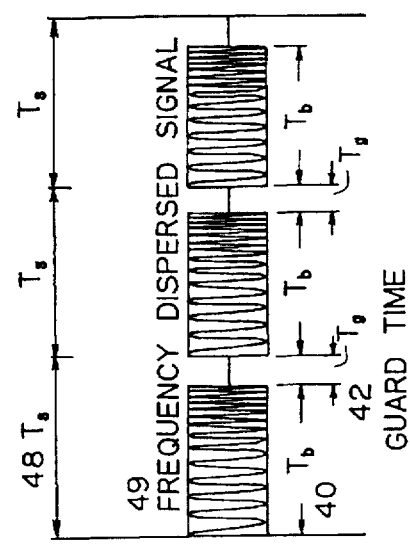

The frequency dispersed signal 50 received in the HUB station is, then, multiplied with the chirp signal 54 of FIG. 2(e) which has opposite characteristics on a frequency axis to that of FIG. 2(b), and the phase modulation signal in FIG. 2(f) is obtained. The instantaneous frequency of the chirp signal 54 changes continuously on a time axis from $f_2'$(52) to $f_1'$(53) during a TDMA burst period $T_s$(48) from top to burst end. Although the chirp signal 46 in FIG. 2(b) changes continuously on a time axis between instantaneous frequencies $f_1$(44)–$f_2$(45), since the HUB station takes timing control so that a burst timing control error is absorbed in the TDMA guard time $T_g$(55), the frequency band $f_1$(44)–$f_2$(45) is always included in the frequency band $f_1'$(52)–$f_2'$(53).

If a TDMA burst timing control has an error, a phase modulation signal 56 after anti-dispersion has some frequency offset, however, the affection by the offset may be simply removed by using a conventional frequency control circuit (AFC).

Although the above embodiment is directed to a digital communication system for a fixed type station using a satellite, the present invention is applicable to a mobile communication system using a satellite, merely by replacing a USAT station with a mobile station, and that system is obvious to those skilled in the art based upon the embodiment described.

The present invention is applicable to a land mobile communication system by substituting a mobile station in a land mobile communication system with the USAT station, and a base station and a network control station in the land mobile communication system with the HUB station. Further, the present invention is applicable to any kind of radio communication system including a land communication system using a fixed type radio terminal.

Although a phase modulation technique which is usually used a in satellite communication system is described in the embodiment, the present invention is applicable to any modulation and/or demodulation system.

Further, although a frequency of a chirp signal which changes continuously on a time axis in each TDMA burst period, is linearly changed in the embodiment, the frequency change ratio is not restricted to a linear function, but a wavelet function, a rectangular function, and other functions are possible.

The present invention has at least the following effects.

(1) As signal power density in a return link from a slave station to a master station is decreased, an interference signal power to another radio communication system is reduced.

(2) Since signal power density in a return link from a slave station to a master station is decreased, and since an interference signal power to another radio communication system is reduced, it is possible to use a small simple antenna which has a broad beam pattern and is simple in design, and therefore, cost for an antenna system in a slave station is reduced.

(3) A network control system in a conventional radio communication system is used in the present invention. So, the cost for constructing a system of the present invention is low.

(4) As for a spurious impulse signal on a frequency axis generated in a transmitter in a slave station, the spectrum of the spurious signal is dispersed by anti-dispersion in a receiver in a master station. Therefore, the affect on a desired modulation signal by the spurious signal is reduced.

From the foregoing it has now been apparent that a new and improved energy dispersal method for a TDMA carrier has been found. It should be appreciated of course that the embodiments disclosed are merely illustrative and are not intended to limit the scope of the invention. Reference should be made to the appended claims, therefore, for indicating the scope of the invention.

What is claimed is:

1. An energy dispersal method for a TDMA carrier in a radio communication system comprising:

a plurality of slave stations, and a master station which communicates with said slave stations through a Time Division Multiple Access (TDMA) control system which functions as a link control protocol, each of said slave stations multiplying a modulation signal, which is sent from said slave station by a first chirp signal, said first chirp signal changes its frequency on a time axis during a TDMA burst period, wherein said modulation signal is dispersed on a frequency axis to a predetermined bandwidth by changing a carrier frequency from said slave station to said master station during said TDMA burst period, therein reducing signal power density of a transmit signal of said slave station, said master station a) receiving a frequency dispersed signal from said slave station, b) multiplying said frequency dispersed signal by a second chirp signal, which has opposite characteristics to said first chirp signal which changes frequency continuously on said time axis and which is used in said slave station during said TDMA burst period, by using TDMA burst timing information, wherein said modulation signal is reproduced in a frequency dispersed received signal, and c) demodulating said reproduced modulation signal by using a demodulator to provide a demodulated signal.

* * * * *